United States Patent
Agrawal et al.

(10) Patent No.: US 12,431,127 B2
(45) Date of Patent: Sep. 30, 2025

(54) SYSTEM AND METHOD FOR NEURAL NETWORK MULTILINGUAL SPEECH RECOGNITION

(71) Applicant: Microsoft Technology Licensing, LLC, Redmond, WA (US)

(72) Inventors: Purvi Agrawal, Hyderabad (IN); Vikas Joshi, Bengaluru (IN); Basil Abraham, Hyderabad (IN); Tejaswi Seeram, Kakinada (IN); Rupeshkumar Rasiklal Mehta, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 466 days.

(21) Appl. No.: 17/853,055

(22) Filed: Jun. 29, 2022

(65) Prior Publication Data

US 2024/0005912 A1    Jan. 4, 2024

(51) Int. Cl.
*G10L 15/00* (2013.01)
*G10L 15/06* (2013.01)
(Continued)

(52) U.S. Cl.
CPC ............ *G10L 15/16* (2013.01); *G10L 15/005* (2013.01); *G10L 15/063* (2013.01); *G10L 15/22* (2013.01)

(58) Field of Classification Search
CPC ......... G10L 15/16; G10L 15/02; G10L 25/30; G10L 15/22; G10L 15/063;
(Continued)

(56) References Cited

U.S. PATENT DOCUMENTS 9,460,711 B1 * 10/2016 Vanhoucke ............ G10L 15/16
11,151,984 B2 * 10/2021 Lichun ................... G10L 25/78
(Continued)

OTHER PUBLICATIONS

J. Yi, J. Tao, Z. Wen and Y. Bai, "Language-Adversarial Transfer Learning for Low-Resource Speech Recognition," in IEEE/ACM Transactions on Audio, Speech, and Language Processing, vol. 27, No. 3, pp. 621-630, Mar. 2019, doi: 10.1109/TASLP.2018.2889606. (Year: 2019).*

(Continued)

*Primary Examiner* — Edgar X Guerra-Erazo
(74) *Attorney, Agent, or Firm* — Shook, Hardy & Bacon L.L.P.

(57) ABSTRACT

Systems, methods, and computer-readable storage devices are disclosed for improved recognition of multiple languages in audio data. One method including: receiving a trained split head multilingual neural network model, the trained split head multilingual neural network model including shared acoustic model layers and a plurality of projection layers, each projection layer of the plurality of projection layers corresponding to a language that the trained split head multilingual neural network model recognizes; receiving audio data, the audio data including speech in a plurality of languages in the audio data, the speech in the plurality of languages corresponding the language recognized by a projection layer of the plurality of projection layers of the trained split head multilingual neural network model; and classifying one or more languages of the speech of the audio data using the trained split head multilingual neural network model.

19 Claims, 7 Drawing Sheets

(51) Int. Cl.
*G10L 15/16* (2006.01)
*G10L 15/22* (2006.01)

(58) Field of Classification Search
CPC . G10L 2015/025; G10L 15/005; G10L 15/00; G10L 15/01; G10L 15/06; G10L 2015/0636; G10L 2015/0631; G10L 2015/0633; G10L 2015/0635; G10L 2015/0638; G10L 15/065; G10L 15/075; G10L 15/07; G10L 15/08; G10L 15/083; G10L 15/18; G10L 15/1807; G10L 15/20; G10L 2015/223; G10L 2015/225; G10L 17/18; G06N 20/00; G06N 3/02; G06N 20/20; G06N 3/08; G06N 3/096; G06N 3/0985; G06N 3/094; G06N 3/092; G06N 3/091; G06N 3/09; G06N 3/0895; G06N 3/088; G06N 3/045; G06N 3/0455; G06N 3/0464; G06N 3/047; G06N 3/0475; G06N 3/048

See application file for complete search history.

(56) References Cited

U.S. PATENT DOCUMENTS

| | | | |
|---|---|---|---|
| 12,014,725 B2* | 6/2024 | Huang | G10L 15/063 |
| 2017/0236518 A1* | 8/2017 | Lane | G10L 15/14 704/240 |
| 2020/0334527 A1* | 10/2020 | Das | G10L 15/32 |
| 2022/0108688 A1* | 4/2022 | Wang | G10L 15/063 |
| 2022/0310070 A1* | 9/2022 | Moritz | G10L 15/28 |

OTHER PUBLICATIONS

R. K. Vuddagiri, T. Mandava, H. K. Vydana and A. K. Vuppala, "Multi-Head Self-Attention Networks for Language Identification," 2019 Twelfth International Conference on Contemporary Computing (IC3), Noida, India, 2019, pp. 1-5, doi: 10.1109/IC3.2019.8844925. (Year: 2019).*

"Amazon's Alexa speaks Hinglish in an Indian accent, and Apple's Siri will too", Retrieved From: https://indianexpress.com/article/technology/amazons-alexa-speaks-hinglish-in-an-indian-accent-and-apples-siri-will-too-4915518/, Oct. 31, 2017, 6 Pages.

Emond, et al., "Transliteration Based Approaches to Improve Code-Switched Speech Recognition Performance", In Proceedings of Spoken Language Technology Workshop, Dec. 18, 2018, pp. 448-455.

Huang, et al., "Cross-Language Knowledge Transfer Using Multilingual Deep Neural Network With Shared Hidden Layers", In Proceedings of IEEE International Conference on Acoustics, Speech and Signal Processing, May 26, 2013, pp. 7304-7308.

Vaswani, et al., "Attention Is All You Need", In Proceedings of the 31st Conference on Neural Information Processing Systems, Dec. 4, 2017, 11 Pages.

Schwartz, Erich., "Amazon's Alexa Now Speaks Hindi and Hinglish", Retrieved From: https://voicebot.ai/2019/09/19/amazons-alexa-now-speaks-hindi-and-hinglish/, Sep. 19, 2019, 8 Pages.

Tong, et al., "An Investigation of Deep Neural Networks for Multilingual Speech Recognition Training and Adaptation", In Proceedings of Conference of the International Speech Communication Association, Aug. 2017, 5 Pages.

Liu, et al., "A unified system for multilingual speech recognition and language identification", In Journal of Speech Communication, vol. 127, Mar. 2021, pp. 17-28.

* cited by examiner

SYSTEM AND METHOD FOR NEURAL NETWORK MULTILINGUAL SPEECH RECOGNITION

TECHNICAL FIELD

The present disclosure relates to speech recognition that improves accuracy when a plurality of languages are spoken. Specifically, the present disclosure relates to multilingual speech recognition using machine learning, such as a split head neural network with an attention acoustic model, to improve accuracy.

INTRODUCTION

Multilingual and mixed speech recognition offers convenience to end users. Current voice assistant systems support multiple languages including, e.g., voice assistant systems that support queries for English results from Hindi queries or vice-versa. In an example, queries for entertainment can include songs or movie names that often belong to other languages. Therefore, acoustic models should recognize speech and entities in a primary language, but also supported other languages. However, improvement for support of other languages may lead to regression of model accuracy on the primary language of conversation, i.e., English. Thus, there is a need to improve model performance on multiple languages, while ensuring performance does not regress on the primary language.

SUMMARY OF THE DISCLOSURE

According to certain embodiments, systems, methods, and computer-readable media are disclosed for improved recognition of multiple languages in audio data.

According to certain embodiments, a computer-implemented method for improved recognition of multiple languages in audio data is disclosed. One method comprising: receiving a trained split head multilingual neural network model, the trained split head multilingual neural network model including shared acoustic model layers and a plurality of projection layers, each projection layer of the plurality of projection layers corresponding to a language that the trained split head multilingual neural network model recognizes; receiving audio data, the audio data including speech in a plurality of languages in the audio data, the speech in the plurality of languages corresponding the language recognized by a projection layer of the plurality of projection layers of the trained split head multilingual neural network model; and classifying one or more languages of the speech of the audio data using the trained split head multilingual neural network model. The trained split head multilingual neural network model can further include a self-attention module, the self-attention module outputs a weight for each input language, and each respective weight combined with output labels of the respective projection layers. The trained split head multilingual neural network model with the self-attention module combines output probabilities of the plurality of languages to produce final probabilities over all labels. Additionally, the self-attention module can input at least one past frame of the received audio data, a current frame of the received audio data, and at least one future frame frames of the received audio data to estimate the weight for each input language. When the trained split head multilingual neural network model is without the self-attention module, there are language specific projection layers and one layer needs to be selected at the time of model evaluation/testing according to test data language via language identification. In the trained split head multilingual neural network model with the self-attention module, there is no requirement to select the projection layer, as the attention module automatically weighs and combines the projection layer outputs without any requirement of a language identifier.

According to certain embodiments, a system for improved recognition of multiple languages in audio data is disclosed. One system including: a data storage device that stores instructions for improved recognition of multiple languages in audio data; and a processor configured to execute the instructions to perform a method including: receiving a trained split head multilingual neural network model, the trained split head multilingual neural network model including shared acoustic model layers and a plurality of projection layers, each projection layer of the plurality of projection layers corresponding to a language that the trained split head multilingual neural network model recognizes; receiving audio data, the audio data including speech in a plurality of languages in the audio data, the speech in the plurality of languages corresponding the language recognized by a projection layer of the plurality of projection layers of the trained split head multilingual neural network model; and classifying one or more languages of the speech of the audio data using the trained split head multilingual neural network model. The trained split head multilingual neural network model can further include a self-attention module, the self-attention module outputs a weight for each input language, and each respective weight combined with output labels of the respective projection layers. The trained split head multilingual neural network model with the self-attention module combines output probabilities of the plurality of languages to produce final probabilities over all labels. Additionally, the self-attention module can input at least one past frame of the received audio data, a current frame of the received audio data, and at least one future frame frames of the received audio data to estimate the weight for each input language. When the trained split head multilingual neural network model is without the self-attention module, there are language specific projection layers and one layer needs to be selected at the time of model evaluation/testing according to test data language via language identification. In the trained split head multilingual neural network model with the self-attention module, there is no requirement to select the projection layer, as the attention module automatically weighs and combines the projection layer outputs without any requirement of a language identifier.

According to certain embodiments, a computer-readable storage device storing instructions that, when executed by a computer, cause the computer to perform a method for improved recognition of multiple languages in audio data is disclosed. One method of the computer-readable storage devices including: receiving a trained split head multilingual neural network model, the trained split head multilingual neural network model including shared acoustic model layers and a plurality of projection layers, each projection layer of the plurality of projection layers corresponding to a language that the trained split head multilingual neural network model recognizes; receiving audio data, the audio data including speech in a plurality of languages in the audio data, the speech in the plurality of languages corresponding the language recognized by a projection layer of the plurality of projection layers of the trained split head multilingual neural network model; and classifying one or more languages of the speech of the audio data using the trained split head multilingual neural network model. The trained split head multilingual neural network model can further include a self-attention module, the self-attention module outputs a weight for each input language, and each respective weight combined with output labels of the respective projection layers. The trained split head multilingual neural network model with the self-attention module combines output probabilities of the plurality of languages to produce final probabilities over all labels. Additionally, the self-attention module can input at least one past frame of the received audio data, a current frame of the received audio data, and at least one future frame frames of the received audio data to estimate the weight for each input language. When the trained split head multilingual neural network model is without the self-attention module, there are language specific projection layers and one layer needs to be selected at the time of model evaluation/testing according to test data language via language identification. In the trained split head multilingual neural network model with the self-attention module, there is no requirement to select the projection layer, as the attention module automatically weighs and combines the projection layer outputs without any requirement of a language identifier.

According to certain embodiments, a trained split head multilingual neural network model is disclosed. One trained split head multilingual neural network model comprising: shared acoustic model layers; and a plurality of projection layers, each projection layer of the plurality of projection layers corresponding to a language that the trained split head multilingual neural network model recognizes, the trained split head multilingual neural network model classifying one or more languages of the speech of input audio data. The trained split head multilingual neural network model may further comprise a self-attention module, the self-attention module outputs a weight for each input language, and each respective weight combined with output labels of the respective projection layers.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

Figure 1:
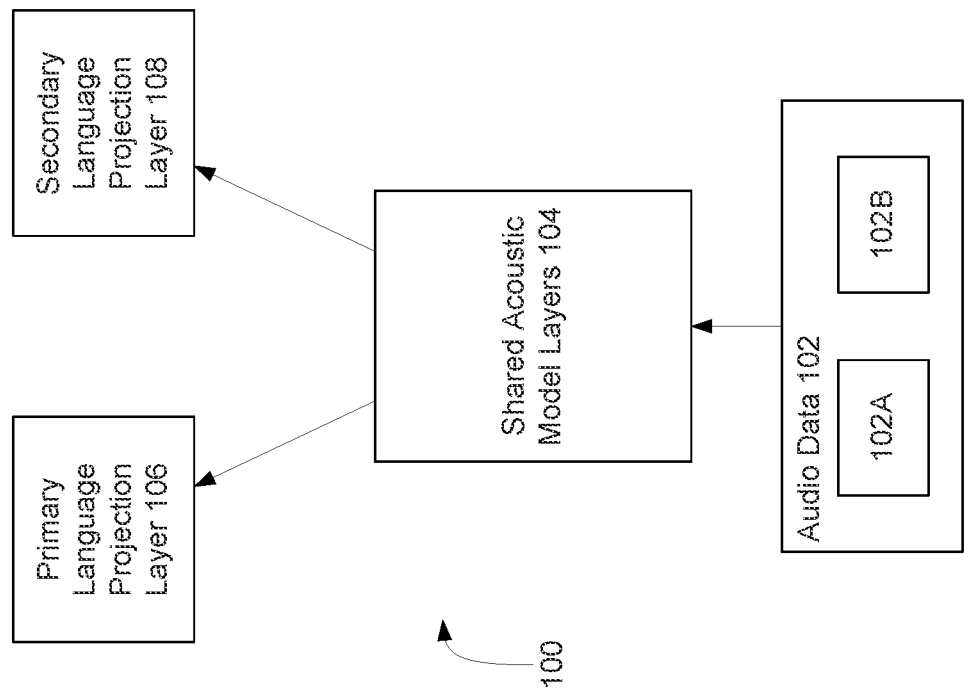
FIG. 1 depicts exemplary a split head neural network model for multilingual speech recognition, according to embodiments of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, a methodology to improve multilingual speech recognition using machine learning, such as a split head neural network with an attention acoustic model, to improve accuracy. There are various aspects of multilingual speech recognition that may be improved through the use of a neural network, as discussed herein.

Embodiments of the present disclosure provide a machine learning approach which may be used to accurately recognize speech having a plurality of languages. In particular, neural networks may be used as the machine learning approach. The approach of embodiments of the present disclosure may be based on training one or more neural networks to recognize a plurality of languages in speech. Neural networks that may be used include, but not limited to, deep neural networks, convolutional neural networks, recurrent neural networks, etc.

As non-limiting examples of use of speech recognition, a primary language may be used by a voice assistant to receive and response to user queries. For example, an English voice assistant may receive a query "hey [voice assistant], play a song by Ed Sheeran," which is a wholly English query. The same English voice assistant may also receive a query "hey [voice assistant], play song ae dil hai mushkil," which is an English query for Hindi songs, i.e., an English+Hindi/Hindi+English query. Further, the "hey [voice assistant], play a song by Ed Sheeran," which is a wholly English query. The same English voice assistant may also receive a query "mujheamitabh bachahan ke gaane sunao," which is a wholly Hindi query. Thus, queries may include entities (songs, movie names, people's names) in other languages even for a primary language endpoint.

Embodiments, as disclosed herein, improve a primary language acoustic model performance on a secondary language without degrading the performance of the primary language. One solution may be to have a single multilingual acoustic model that recognizes a plurality of languages from input audio data. However, this solution may be inferior using highly trained monolingual acoustic models. Thus, another solution may be to have a combination of multiple monolingual acoustic models that receive input audio data, have each monolingual acoustic model conduct speech recognition, and select the output from the monolingual acoustic model of the correct language. Such a solution may use a language identifier to determine which acoustic model output to use. Thus, for example, English automatic speech recognition may be used for English utterances, and Hindi automatic speech recognition may be used for Hindi utterances. However, such a solution may have errors in language identification. In both of these methods, performance on the primary language degrades in order to improve performance on a secondary language.

FIG. 1 depicts exemplary a split head neural network model 100 for multilingual speech recognition, according to embodiments of the present disclosure. Specifically, FIG. 1 depicts audio data 102 including speech in at least two languages, such as English 102A and Hindi 102B, being input into shared acoustic model layers 104. The shared acoustic model layers 104 may be configured to recognize speech and output the recognition to at least two projection layers 106 and 108. As shown in FIG. 1, projection layer 106 is a primary language projection layer 106 (English projection layer) and projection layer 108 is a secondary language projection layer (Hindi projection layer). The at least two projection layers 106 and 108, each of which corresponds to one of the at least two languages, may provide recognized speech output according to the one of the at least two languages of the particular projection layers.

The split head acoustic model, as shown in FIG. 1, may match performance of monolingual models on a primary language, and may significantly improve the performance on the one or more secondary languages with performance close to their corresponding monolingual models. Table 1 depicts word error rates (WER) of various language models. WER is a metric for measuring speech-to-text accuracy of automatic speech recognition systems.

TABLE 1

|  | Monolingual English Model | Monolingual Hindi Model | Split Head Acoustic Model |
| --- | --- | --- | --- |
| English test set | 17.02 | 26.5 | 17.05 |
| Hindi test set | 34.5 | 10.9 | 12.3 |

Returning to FIG. 1, the split head neural network model 100 may be trained with cross entropy (CE) loss. The split head neural network model 100 includes an acoustic model that has language specific projection/output layers 106 and 108 and shared acoustic model layers 104. All languages of separate projection/output layer per input language 106 and 108 may use the same output labels, which is unlike shared acoustic model layer 104 which may be trained where each layer has its own output labels. Having a separate projection/output layer per input language 106 and 108 may allow the model to learn the language specific characteristics, while the shared acoustic model layers 104 benefit from robust training from a large amount of training data. In the shared acoustic model layers 104, each language can have its respective senones, i.e., output units or smallest speech unit modeled, and all input languages may use same senones as that of the primary language. Having the same senones enables combination of posteriors from multiple languages. The ability to combine posteriors may provide improvements and/or further developments.

The training for a neural network model may be performed on a plurality of datasets to account for variability between measured subjects and/or different measurement setups. By training the neural model on the plurality of datasets, the network model may learn language specific characteristics across the datasets. As explained in more detail below, experimental results may indicate that a neural network can recognize speech having multiple languages.

Figure 2:
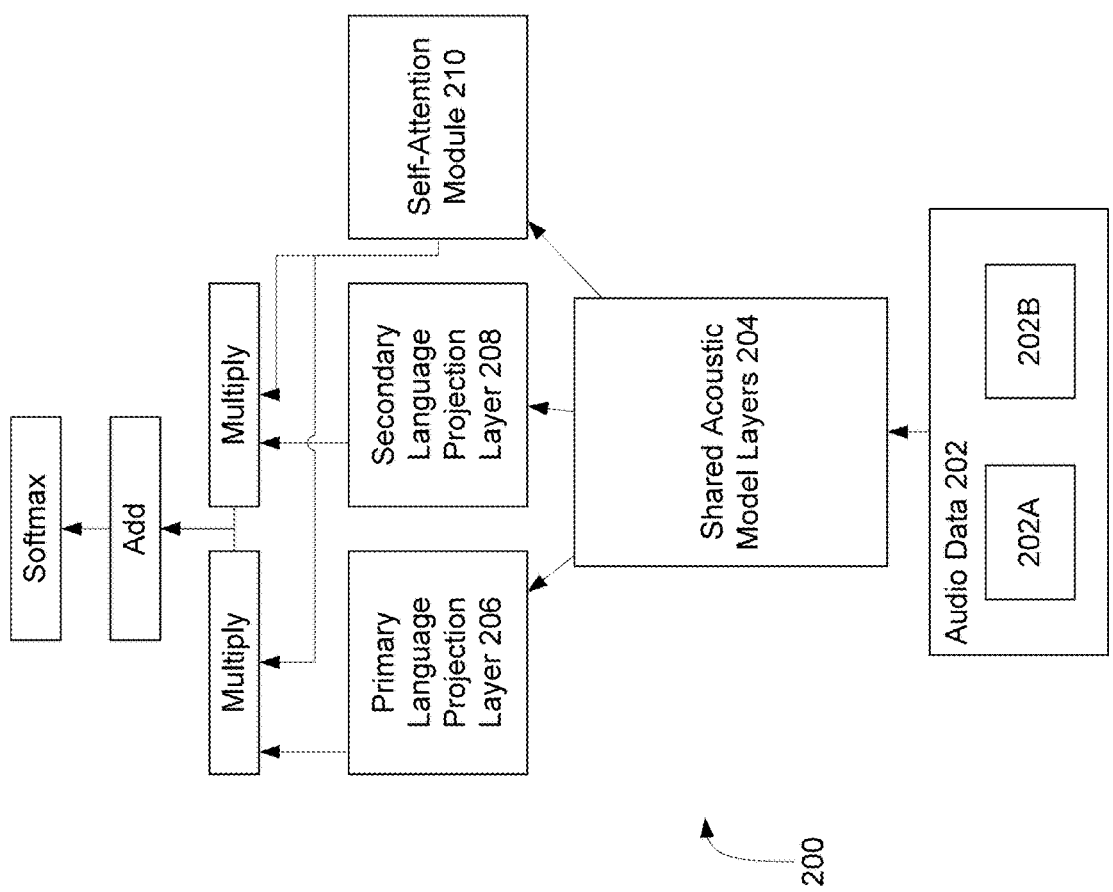
FIG. 2 depicts a split head neural network model with self-attention for multilingual speech recognition, according to embodiments of the present disclosure.

As mentioned above, embodiments of the present disclosure may be used to recognize multilingual speech using a neural network. However, more generally, the present disclosure may also use self-attention to further improve multilingual speech recognition through the use of a neural network. FIG. 2 depicts a split head neural network model with self-attention 200 for multilingual speech recognition, according to embodiments of the present disclosure. As shown in FIG. 2, the split head neural network model with self-attention may produce a single output vector, i.e., posterior probabilities over all senones. Conversely, the split head neural network model 100 without self-attention of FIG. 1 may produce multiple outputs, i.e., one per language via its respective projection layers for each input frame.

FIG. 2 depicts audio data 202 including speech in at least two languages, such as English 202A and Hindi 202B, being input into shared acoustic model layers 204. The shared acoustic model layers 204 may be configured to recognize speech and output the recognition to at least two projection layers 206 and 208. As shown in FIG. 2, projection layer 206 is a primary language projection layer 206 (English projection layer) and projection layer 208 is a secondary language projection layer 208 (Hindi projection layer). The at least two projection layers 206 and 208, each of which corresponds to one of the at least two languages, may provide recognized speech output according to the one of the at least two languages of the particular projection layers. The split head neural network model with self-attention 200 may combine multiple outputs from different languages via an attention module 210 to produce a single weighted output vector. For example, a weight of each language at the output is obtained by a self-attention module 210, which may take the shared hidden representations as input to produce language-specific weights. The attention module 210 may be part of the same acoustic model, and the attention module 210 may be trained jointly. Therefore, the output of the split head neural network model with self-attention may be a weighted combination of posterior probabilities from different languages.

As shown in FIG. 2, the primary language projection layer 206 may perform well on primary language data, e.g., English data, and the secondary language projection layer 208 may perform well on secondary language data, e.g., Hindi data. The split head neural network model with attention 200 may combine the English and Hindi output probabilities to produce final probabilities over all labels. The output labels in the FIGS. 1 and 2 may represent a number of labels or senones. The English and Hindi outputs may be combined as they are of same dimensions and represent the same senone set. The self-attention module 210 may estimate weights for English and Hindi based on the audio characteristics. The input of the self-attention module 210 may be the encoder hidden representation from past, current, and few future frames to estimates the weights. (See, e.g., FIG. 3). The self-attention module 210 may output a weight for each input language. Each respective weight may be combined, for example, multiplied, with the output labels of the respective primary language projection layer 206 and the secondary language projection layer 208. Then, combined weighted output labels may be added and input into a softmax function or normalized exponential function, which may normalize the output of the split head neural network model with self-attention 200 to a probability distribution over predicted output classes.

Figure 3:
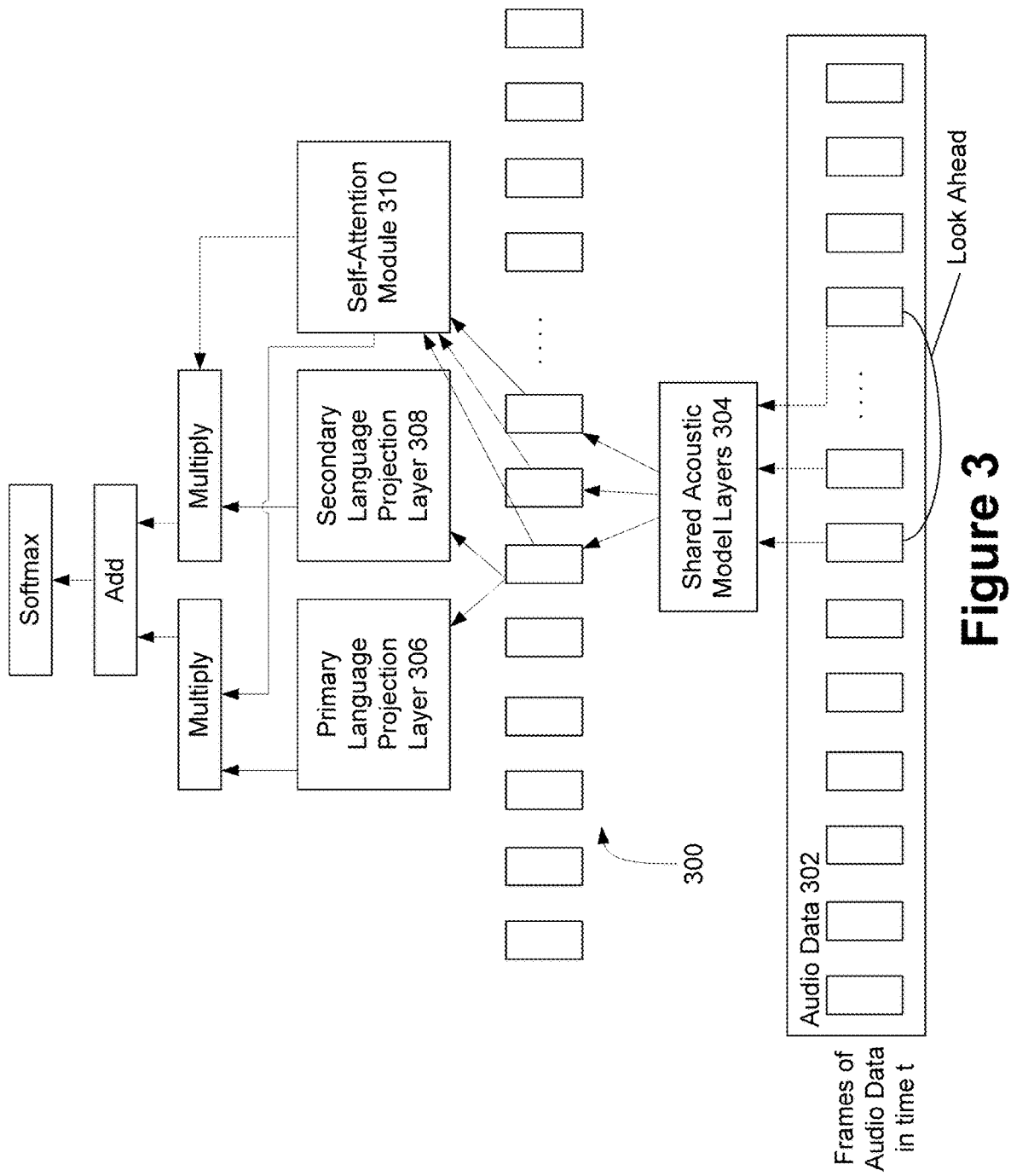
FIG. 3 depicts input and outputs of a split head neural network model with self-attention for multilingual speech recognition, according to embodiments of the present disclosure.

FIG. 3 depicts input and outputs of a split head neural network model with self-attention for multilingual speech recognition, according to embodiments of the present disclosure. FIG. 3 depicts audio data 302 including speech in at least two languages, such as English and Hindi, being input into shared acoustic model layers 304. The shared acoustic model layers 304 may be configured to recognize speech and output the recognition to at least two projection layers 306 and 308. As shown in FIG. 3, projection layer 306 is a primary language projection layer 306 (English projection layer) and projection layer 308 is a secondary language projection layer 308 (Hindi projection layer). The at least two projection layers 306 and 308, each of which corresponds to one of the at least two languages, may provide recognized speech output according to the one of the at least two languages of the particular projection layers. The split head neural network model with self-attention 300 may combine multiple outputs from different languages via an attention module 310 to produce a single weighted output vector. For example, a weight of each language at the output is obtained by a self-attention module 310, which may take the shared hidden representations as input to produce language-specific weights. As shown in FIG. 3, the input of the self-attention module 310 may receive look ahead information from the audio data 302 that includes past, current, and few future frames to estimates the weights. The attention module 310 may be part of the same acoustic model, and the attention module 310 may be trained jointly. Therefore, the output of the split head neural network model with self-attention may be a weighted combination of posterior probabilities from different languages.

The self-attention module 310 may output a weight for each input language. Each respective weight may be combined, for example, multiplied, with the output labels of the respective primary language projection layer 306 and the secondary language projection layer 308. Then, combined weighted output labels may be added and input into a softmax function or normalized exponential function, which may normalize the output of the split head neural network model with self-attention 300 to a probability distribution over predicted output classes.

Figure 4:
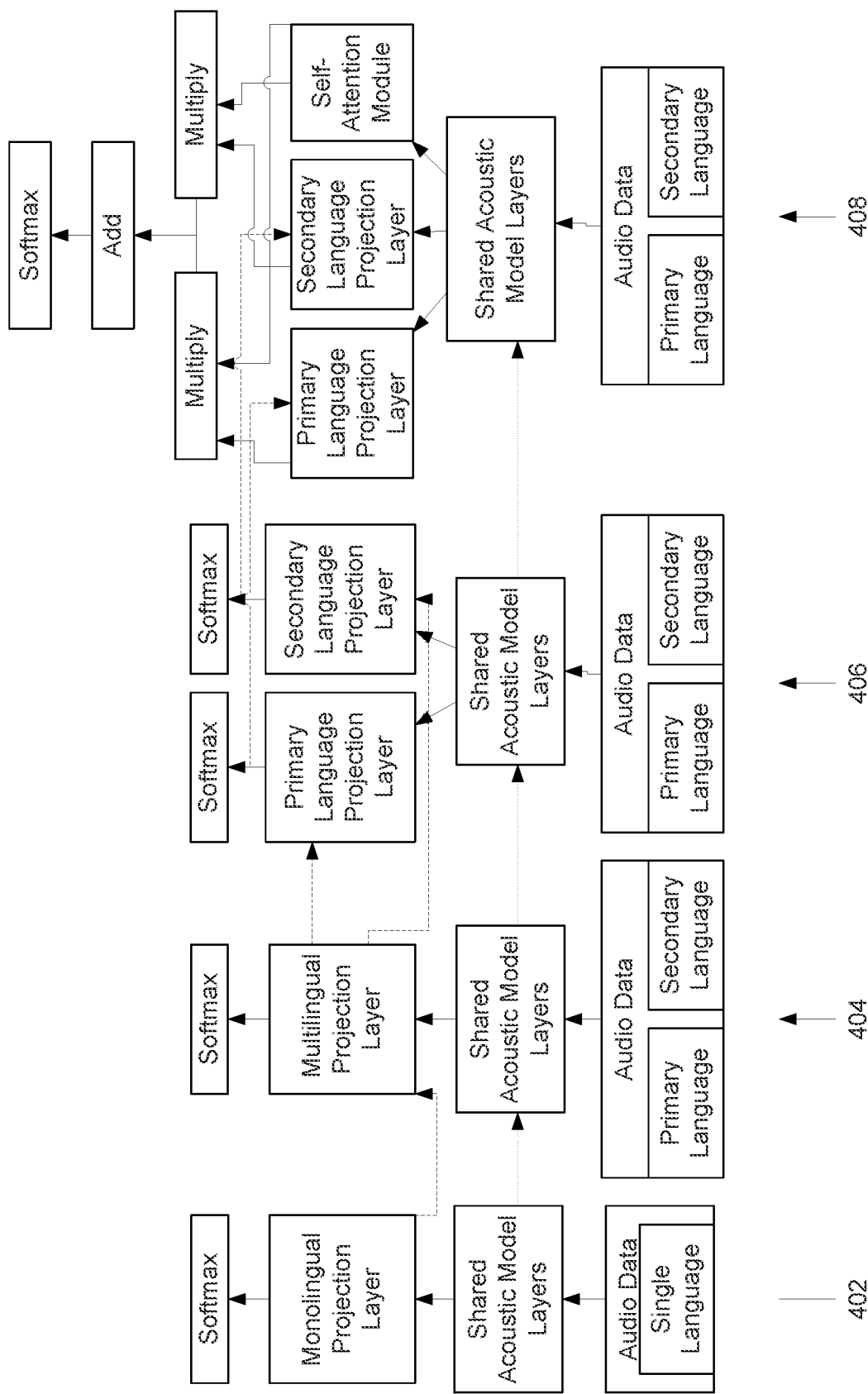
FIG. 4 depicts the construction and/or training of a split head neural network model with self-attention for multilingual speech recognition, according to embodiments of the present disclosure.

In embodiments of the present disclosure, a neural network may be implemented. Of course, a person of ordinary skill in the art may implement embodiments of the present disclosure with any type of neural network architectures. The full neural network model (shared hidden layers, all projection layers as well as attention module) with data pooled from all languages may be trained. FIG. 4 depicts the construction and/or training of a split head neural network model with self-attention for multilingual speech recognition, according to embodiments of the present disclosure. The latency of the proposed model may be comparable to that of a monolingual model. Therefore, the proposed acoustic models may replace the conventional monolingual acoustic models as it maintains parity on the primary language and significantly improves on the other languages.

As shown in FIG. 4, the split head neural network model with self-attention may initially be constructed by starting with a monolingual neural network model 402 having been trained on a primary language, e.g., English. From the initial monolingual neural network model 402, data may be pooled, and a multilingual neural network model 404 may be produced by training the multilingual neural network model 404 on the primary language and a secondary language. The multilingual neural network model 404 may have a combined projection layer that combines the primary language and the secondary language. Then, the combined projection layer may be split into a plurality of projection layers, where each projection layer corresponds to a respective language of the languages input into the neural network. By splitting the multilingual neural network model 404, a split head neural network model 406 may be produced. Then, a self-attention attention module may be trained with the split head neural network model 406 to produce a split head neural network model with self-attention 408.

The neural network may be trained to not over fit, as both weight decay and dropout may hurt the final performance. The neural network model may be constructed to include a plurality of neurons, and may be configured to output final probabilities over all labels. In an embodiment where a neural network is addressing a regression problem, the neural network may be configured to output a probability of a recognized language of the plurality of languages. The plurality of neurons may be arranged in a plurality of layers, including at least one hidden layer, and may be connected by a plurality of connections.

Those skilled in the art will appreciate that neural networks may be conducted in regard to a model and may include phases: model creation (neural network training), as discussed above, model validation (neural network testing), and model utilization (neural network evaluation), though these phases may not be mutually exclusive. According to embodiments of the present disclosure, neural networks may be implemented through training, inference, and evaluation stages. Input samples generated may be utilized, along with corresponding ground-truth labels for neural network training and inference. For a baseline neural network, the model may have input layer of a predetermined number of neurons, at least one intermediate (hidden) layer each of another predetermined number of neurons, and an output layer having yet another predetermined number of neurons.

At least one server may execute a machine learning component of the audio processing system described herein. As those skilled in the art will appreciate, machine learning may be conducted in regard to a model and may include at least three phases: model creation, model validation, and model utilization, though these phases may not be mutually exclusive. As discussed in more detail below, model creation, validation, and utilization may be on-going processes of a machine learning.

For the machine learning, the model creation phase may involve extracting features from a training dataset. The machine learning component may monitor the ongoing audio data to extract features. As those skilled in the art will appreciate, these extracted features and/or other data may be derived from machine learning techniques on large quantities of data collected over time based on patterns. Based on the observations of this monitoring, the machine learning component may create a model (i.e., a set of rules or heuristics) for extracting features from audio data. The baseline neural network may be trained to, for example, minimize a classification error and/or minimize squared error between ground-truth and predicted labels.

During a second phase of machine learning, the created model may be validated for accuracy. During this phase, the machine learning component may monitor a test dataset, extract features from the test dataset, and compare those extracted features against predicted labels made by the model. Through continued tracking and comparison of this information and over a period of time, the machine learning component may determine whether the model accurately predicts a language of the audio data. This validation is typically expressed in terms of accuracy: i.e., what percentage of the time does the model predict the correct labels. Information regarding the success or failure of the predictions by the model may be fed back to the model creation phase to improve the model and, thereby, improve the accuracy of the model.

During the inference phase, additionally data from a test dataset may be applied to the trained baseline neural network to generate the predicted labels. The predicted labels may then be compared with the ground-truth labels to compute performance metrics including mean-square error.

A third phase of machine learning may be based on a model that is validated to a predetermined threshold degree of accuracy. For example, a model that is determined to have at least a 50% accuracy rate may be suitable for the utilization phase. According to embodiments of the present disclosure, during this third, utilization phase, the machine learning component may extract features from audio data where the model suggests a probability of a language and/or classify the language of input audio data. Upon suggesting a probability and/or classifying the audio data, the model outputs the probability/classification and may store the data. Of course, information based on the confirmation or rejection of the various stored probabilities/classifications of data may be returned back to the previous two phases (validation and creation) as data to be used to refine the model in order to increase the model's accuracy.

Data may need to be prepared when training a split head neural network model with self-attention. For example, a primary language is used in alignment for both primary language features and secondary language features. The primary language alignment model may be sub-optimal for secondary language data, but is necessary to combine the primary language and the secondary language output probabilities with self-attention. With the primary language alignment model, the secondary language projection layer can be modeled with the same primary language senones.

Figure 5:
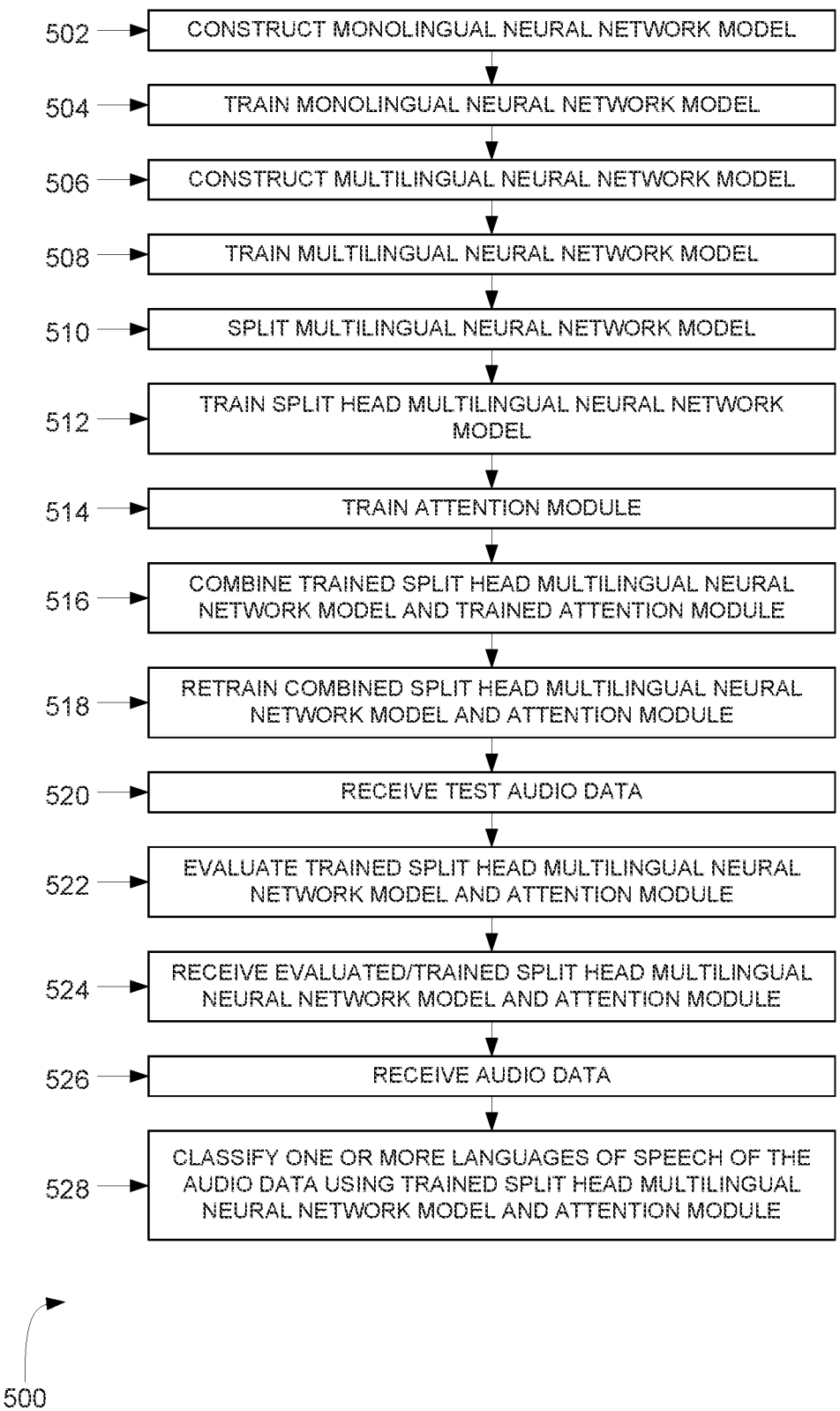
FIG. 5 depicts a method of constructing and/or training a split head neural network model with self-attention for multilingual speech recognition, according to embodiments of the present disclosure.

FIG. 5 depicts a method of constructing and/or using a split head neural network model with self-attention for multilingual speech recognition, according to embodiments of the present disclosure. The method may begin, in which a neural network model may be constructed and/or received according to a set of instructions. The neural network model may include a plurality of neurons. The neural network model may be configured to output a probability of a particular language and/or classification of a particular language of input audio data. The plurality of neurons may be arranged in a plurality of layers, including at least one hidden layer, and may be connected by connections. Each connection including a weight. The neural network model may comprise a neural network model. The neural network model may comprise an input layer, at least one fully-connected hidden layer, a plurality of projection layers, a combination layer (multiply/add), and a softmax output layer.

Then, a training data set may be received. The training data set may include audio data. The audio data may include a plurality of languages. However, embodiments of the present disclosure are not necessarily limited to audio data. Further, the received training data set may include data that has been previously scaled for precision. Additionally, and/or alternatively, the received training data set may be scaled for precision.

The neural network model may be trained using the training data set. Then, the trained neural network model may be outputted. The trained neural network model may be used to output probabilities/classification of a language of the input audio data. The trained neural network model may include the plurality of at least one-bit neurons. The plurality of the neurons may be arranged in the plurality of layers, including the at least one hidden layer, and may be connected by connections. Each connection may include a weight. In certain embodiments of the present disclosure, the neural network may comprise one or more hidden layers.

A test data set may be received. Alternatively, and/or additionally, a test data set may be created. Further, embodiments of the present disclosure are not necessarily limited to audio data. The received test data set may include data that has been previously scaled for precision. Additionally, and/or alternatively, the received test data set may be scaled for precision.

Then, the trained neural network may then be tested for evaluation using the test data set. Further, once evaluated to pass a predetermined threshold, the trained neural network may be utilized. Additionally, in certain embodiments of the present disclosure, the method may be repeated to produce a plurality of trained neural networks. The plurality of trained neural networks may then be compared to each other and/or other neural networks.

The outputted train neural network model that is configured to output probabilities/classification of a language of the input audio data may then be used in to recognize multiple languages in speech.

Turning back to FIG. 5, the figure depicts a method of constructing and/or using a split head neural network model with self-attention for multilingual speech recognition, according to embodiments of the present disclosure. The method 500 may begin at 502 where a monolingual neural network model is constructed. The monolingual neural network model may include shared acoustic model layers and a primary language projection layer. Then, the monolingual network model may be trained at 504 on input audio data, the input audio data including speech only in the primary language.

Next, and/or alternatively as an initial construction, at 506, a multilingual neural network model may be constructed based on the trained monolingual neural network model or simply constructed. The multilingual neural network model may include shared acoustic model layers and a combined primary language and secondary language projection layer. At 508, the multilingual neural network model may be trained on input audio data. The input audio data may include speech in a primary language and a secondary language.

After receiving/constructing-training the trained multilingual neural network model, the combined projection layer of the multilingual neural network model may be split at 510 to produce the split head multilingual neural network model. Then at 512, the split head multilingual neural network model may be trained on input audio data. The input audio data including speech in the primary language and the secondary language.

Further, if desired, an attention module at 514 may be trained on the same input audio data. The input audio data including speech in the primary language and the secondary language. Then, at 516, the trained split head multilingual neural network and the trained attention module may be combined. After the combination, at 518, the combined split head multilingual neural network and the attention module may be retrained. The trained split head multilingual neural network model with the self-attention module may combine output probabilities of the plurality of languages to produce final probabilities over all labels. The self-attention module outputs a weight for each input language, and each respective weight combined with output labels of the respective projection layers. Moreover, the self-attention module may input at least one past frame of the received audio data, a current frame of the received audio data, and at least one future frame frames of the received audio data to estimate the weight for each input language.

After training, a test data set may be received at 520, the test data set including test audio data including speech in the primary language and the secondary language. Then, the combined split head multilingual neural network and the attention module may be evaluated at 522 using the received test data set. Additionally, or alternatively, no testing/evaluation may be done, and the trained split head multilingual neural network model with the self-attention module may be output.

Then at 524, the trained split head multilingual neural network model may be received, the trained split head multilingual neural network model including shared acoustic model layers and a plurality of projection layers, each projection layer of the plurality of projection layers corresponding to a language that the trained split head multilingual neural network model recognizes. Then, at 526, audio data may be received, the audio data including speech in a plurality of languages in the audio data, the speech in the plurality of languages corresponding the language recognized by a projection layer of the plurality of projection layers of the trained split head multilingual neural network model. Finally, at 528, one or more languages of the speech of the audio data using the trained split head multilingual neural network model may be classified.

Results of certain testing are indicated in Table 2 below. The split head neural network with attention module shows 59.2% WER reduction on Hindi language test sets, and parity on English language test sets. The split head neural network with attention module performance is close to Hindi Language prod model (10.9% vs 12.3%). Note that Hindi language test sets are evaluated with Hindi language language-model, as the present disclosure is focused on acoustic modeling improvements.

TABLE 2

| Test Set | Utterances | Words | English Language Prod | Hindi Language Prod | Split Head with Self-attention |
|---|---|---|---|---|---|
| English Language | 56,888 | 392,746 | 17.02 | 26.12 | 17.05 |
| Hindi Language | 13,756 | 159,078 | 34.25 | 10.9 | 12.3 |

The split head neural network with attention module was also compared with other work. One other work was a shared hidden layer (SHL), which is one of the popular multilingual methods. The SHL does not allow use to combine English language and Hindi language output layers, as they use language specific senones/labels. The split head neural network with attention module performance is better than SHL. Another conventional multilingual modeling via data pooling was also compared. The data pooled (DP) model performance is inferior to the split head neural network with attention module. Table 3 compares DP, SHL, and split head neural network with attention module. The comparison was done on a different set-up and task than reported in Table 2.

TABLE 3

| Test Set | Utterances | Words | DP | SHL | Split Head with Self-attention |
|---|---|---|---|---|---|
| English Language | 54,669 | 365,327 | 20.35 | 19.27 | 19.08 |
| Hindi Language | 18,070 | 46,387 | 20.78 | 20.7 | 19.8 |

Figure 6:
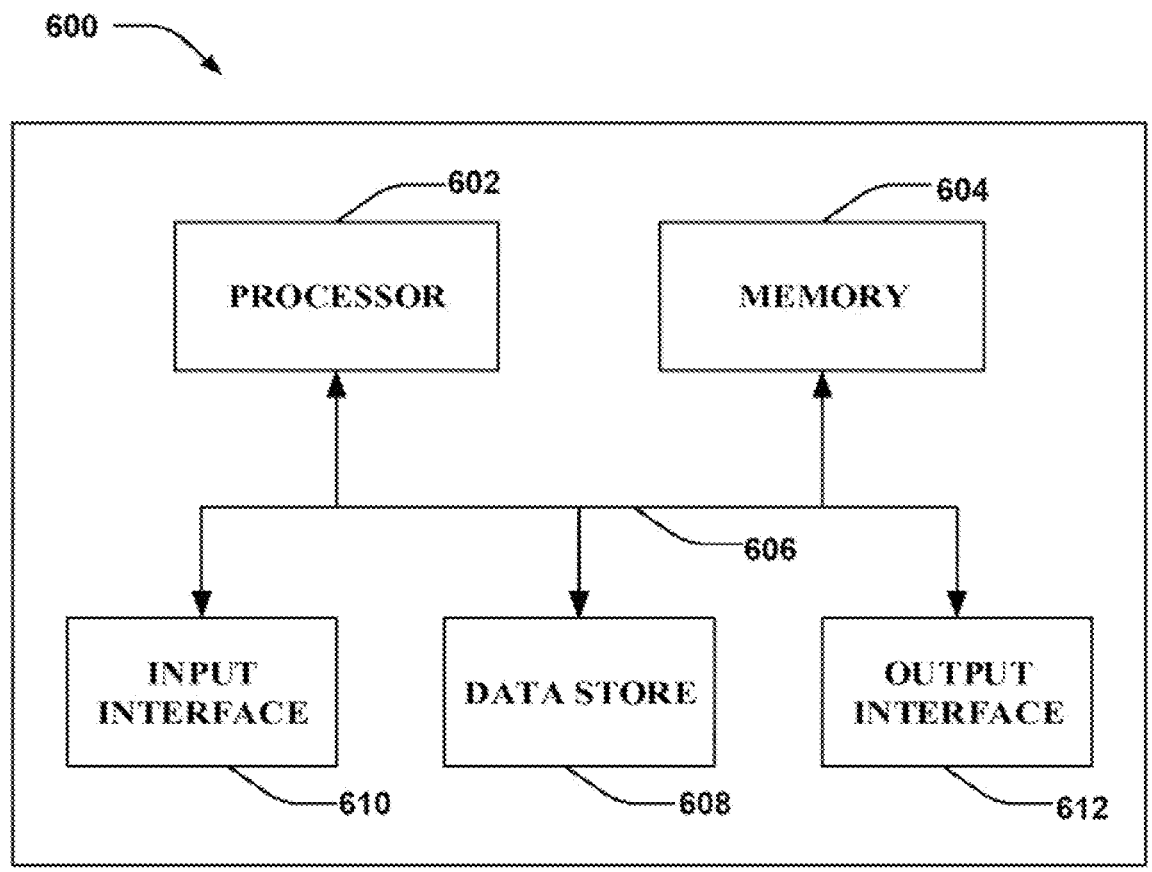
FIG. 6 depicts a high-level illustration of an exemplary computing device that may be used in accordance with the systems, methods, and computer-readable media disclosed herein, according to embodiments of the present disclosure.

FIG. 6 depicts a high-level illustration of an exemplary computing device 600 that may be used in accordance with the systems, methods, modules, and computer-readable media disclosed herein, according to embodiments of the present disclosure. For example, the computing device 600 may be used in a system that processes data, such as audio data, using a neural network, according to embodiments of the present disclosure. The computing device 600 may include at least one processor 602 that executes instructions that are stored in a memory 604. The instructions may be, for example, instructions for implementing functionality described as being carried out by one or more components discussed above or instructions for implementing one or more of the methods described above. The processor 602 may access the memory 604 by way of a system bus 606. In addition to storing executable instructions, the memory 604 may also store data, audio, one or more neural networks, and so forth.

The computing device 600 may additionally include a data store, also referred to as a database, 608 that is accessible by the processor 602 by way of the system bus 606. The data store 608 may include executable instructions, data, examples, features, etc. The computing device 600 may also include an input interface 610 that allows external devices to communicate with the computing device 600. For instance, the input interface 610 may be used to receive instructions from an external computer device, from a user, etc. The computing device 600 also may include an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 600 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for example, several devices may be in communication by way of a network connection and may collectively perform tasks described as being performed by the computing device 600.

Figure 7:
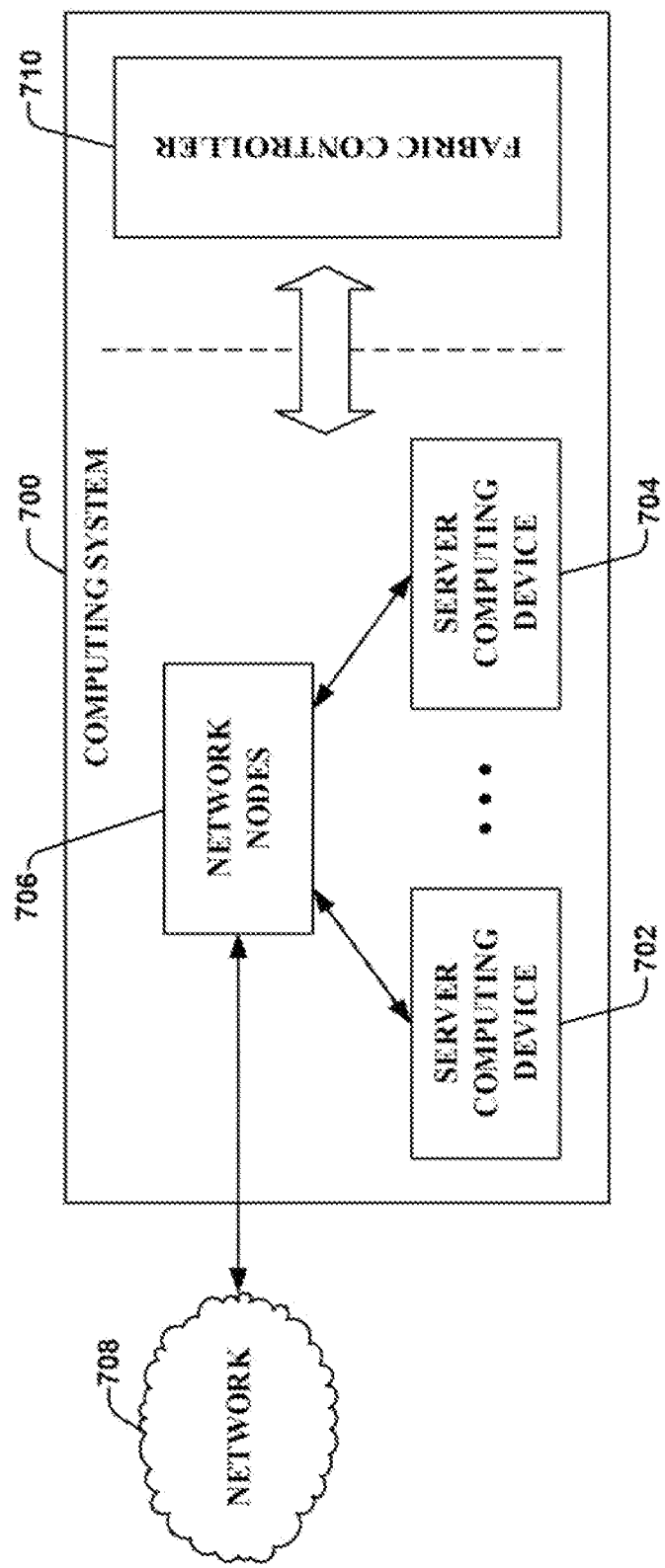
FIG. 7 depicts a high-level illustration of an exemplary computing system that may be used in accordance with the systems, methods, and computer-readable media disclosed herein, according to embodiments of the present disclosure.

Turning to FIG. 7, FIG. 7 depicts a high-level illustration of an exemplary computing system 700 that may be used in accordance with the systems, methods, modules, and computer-readable media disclosed herein, according to embodiments of the present disclosure. For example, the computing system 700 may be or may include the computing device 600. Additionally, and/or alternatively, the computing device 600 may be or may include the computing system 700.

The computing system 700 may include a plurality of server computing devices, such as a server computing device 702 and a server computing device 704 (collectively referred to as server computing devices 702-704). The server computing device 702 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 702, at least a subset of the server computing devices 702-704 other than the server computing device 702 each may respectively include at least one processor and a memory. Moreover, at least a subset of the server computing devices 702-704 may include respective data stores.

Processor(s) of one or more of the server computing devices 702-704 may be or may include the processor, such as processor 602. Further, a memory (or memories) of one or more of the server computing devices 702-704 can be or include the memory, such as memory 604. Moreover, a data store (or data stores) of one or more of the server computing devices 702-704 may be or may include the data store, such as data store 608.

The computing system 700 may further include various network nodes 706 that transport data between the server computing devices 702-704. Moreover, the network nodes 706 may transport data from the server computing devices 702-704 to external nodes (e.g., external to the computing system 700) by way of a network 708. The network nodes 702 may also transport data to the server computing devices 702-704 from the external nodes by way of the network 708. The network 708, for example, may be the Internet, a cellular network, or the like. The network nodes 706 may include switches, routers, load balancers, and so forth.

A fabric controller 710 of the computing system 700 may manage hardware resources of the server computing devices 702-704 (e.g., processors, memories, data stores, etc. of the server computing devices 702-704). The fabric controller 710 may further manage the network nodes 706. Moreover, the fabric controller 710 may manage creation, provisioning, de-provisioning, and supervising of managed runtime environments instantiated upon the server computing devices 702-704.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc (RTM) ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for improved recognition of multiple languages in audio data, the method comprising:
    training a multilingual neural network model on first input audio data, the multilingual neural network model including shared acoustic model layers and a single projection layer, and the first input audio data including speech in a primary language and a secondary language;
    splitting the single projection layer of the multilingual neural network model to produce a split head multilingual neural network model;
    training the split head multilingual neural network model on second input audio data, the second input audio data including speech in the primary language and the secondary language to generate a trained split head multilingual neural network model, the trained split head multilingual neural network model including shared acoustic model layers and a plurality of projection layers, each projection layer of the plurality of projection layers corresponding to a language that the trained split head multilingual neural network model recognizes;
    receiving audio data, the audio data including speech in a plurality of languages in the audio data, the speech in the plurality of languages corresponding the language recognized by a projection layer of the plurality of projection layers of the trained split head multilingual neural network model; and
    classifying one or more languages of the speech of the audio data using the trained split head multilingual neural network model.

2. The method according to claim 1, wherein the trained split head multilingual neural network model further includes a self-attention module, the self-attention module outputs a weight for each input language, and each respective weight combined with output labels of the respective projection layers.

3. The method according to claim 2, wherein the trained split head multilingual neural network model with the self-attention module combines output probabilities of the plurality of languages to produce final probabilities over all labels.

4. The method according to claim 2, wherein the self-attention module inputs at least one past frame of the received audio data, a current frame of the received audio data, and at least one future frame of the received audio data to estimate the weight for each input language.

5. The method according to claim 1, further comprising:
    constructing a monolingual neural network model;
    training the monolingual network model on third input audio data, the third input audio data including speech only in the primary language; and
    constructing the multilingual neural network model based on the trained monolingual neural network model.

6. The method according to claim 2, further comprising:
    training the split head multilingual neural network model on first input audio data, the first input audio data including speech in a primary language and a secondary language;
    training the self-attention module on the first input audio data;
    combining the trained split head multilingual neural network and the self-attention module; and
    retraining the combined split head multilingual neural network and the self-attention module.

7. The method according to claim 6, further comprising:
    receiving a test data set, the test data set including test audio data including speech in a primary language and a secondary language; and
    evaluating the combined split head multilingual neural network and the attention module using the received test data set.

8. The method according to claim 1, wherein the plurality of projection layers learn language specific characteristics, and
    wherein in the shared acoustic model layers, all input languages use same senones as that of the primary language.

9. A system for improved recognition of multiple languages in audio data, the system including:
    a data storage device that stores instructions for improved recognition of multiple languages in audio data; and
    a processor configured to execute the instructions to perform a method including: training a multilingual neural network model on first input audio data, the multilingual neural network model including shared acoustic model layers and a single projection layer, and the first input audio data including speech in a primary language and a secondary language;
    splitting the single projection layer of the multilingual neural network model to produce a split head multilingual neural network model;
    training the split head multilingual neural network model on second input audio data, the second input audio data including speech in the primary language and the secondary language to generate a trained split head multilingual neural network model, the trained split head multilingual neural network model including shared acoustic model layers and a plurality of projection layers, each projection layer of the plurality of projection layers corresponding to a language that the trained split head multilingual neural network model recognizes;

receiving audio data, the audio data including speech in a plurality of languages in the audio data, the speech in the plurality of languages corresponding the language recognized by a projection layer of the plurality of projection layers of the trained split head multilingual neural network model; and classifying one or more languages of the speech of the audio data using the trained split head multilingual neural network model.

10. The system according to claim 9, wherein the trained split head multilingual neural network model further includes a self-attention module, the self-attention module outputs a weight for each input language, and each respective weight combined with output labels of the respective projection layers.

11. The system according to claim 10, wherein the trained split head multilingual neural network model with the self-attention module combines output probabilities of the plurality of languages to produce final probabilities over all labels.

12. The system according to claim 10, wherein the self-attention module inputs at least one past frame of the received audio data, a current frame of the received audio data, and at least one future frame of the received audio data to estimate the weight for each input language.

13. The system according to claim 9, wherein the processor is further configured to execute the instructions to perform the method including:

constructing a monolingual neural network model;

training the monolingual network model on third input audio data, the third input audio data including speech only in the primary language; and constructing the multilingual neural network model based on the trained monolingual neural network model.

14. The system according to claim 10, wherein the processor is further configured to execute the instructions to perform the method including:

training the split head multilingual neural network model on first input audio data, the first input audio data including speech in a primary language and a secondary language;

training the self-attention module on the first input audio data;

combining the trained split head multilingual network and the self-attention module; and retraining the combined split head multilingual neural network and the self-attention module.

15. The system according to claim 14, wherein the processor is further configured to execute the instructions to perform the method including:

receiving a test data set, the test data set including test audio data including speech in a primary language and a secondary language; and evaluating the combined split head multilingual neural network and the attention module using the received test data set.

16. The system according to claim 9, wherein the plurality of projection layers learn language specific characteristics, and wherein in the shared acoustic model layers, all input languages use same senones as that of the primary language.

17. A non-transitory computer-readable medium storing executable instructions embodied thereon, that, as a result of being executed by a processing device, cause the processing device to perform operations comprising:

generating a trained split head multilingual neural network model comprising:

shared acoustic model layers; and a plurality of projection layers, each projection layer of the plurality of projection layers corresponding to a language that the trained split head multilingual neural network model recognizes, the trained split head multilingual neural network model classifying one or more languages of speech of input audio data, wherein the trained split head multilingual neural network model is trained by at least:

training a multilingual neural network model on first input audio data, the multilingual neural network model including shared acoustic model layers and a single projection layer, and the first input audio data including speech in a primary language and a secondary language;

splitting the single projection layer of the multilingual neural network model to produce the split head multilingual neural network model;

training the split head multilingual neural network model on second input audio data, the second input audio data including speech in the primary language and the secondary language to generate the trained split head multilingual neural network model.

18. The non-transitory computer-readable medium of claim 17, wherein the trained split head multilingual neural network model further comprises a self-attention module, the self-attention module outputs a weight for each input language, and each respective weight combined with output labels of the respective projection layers.

19. The non-transitory computer-readable medium of claim 17, wherein the trained split head multilingual neural network model further comprises a self-attention module, the self-attention module inputs at least one past frame of the first input audio data, a current frame of the first input audio data, and at least one future frame of the first input audio data to estimate the weight for each input language.

* * * * *